United States Patent [19]

Thompson et al.

[11] Patent Number: 4,649,169

[45] Date of Patent: Mar. 10, 1987

[54] CROSSLINKED VINYL POLYMER COMPOSITIONS AND PROCESS FOR PREPARING MOLDED SHAPED ARTICLES

[75] Inventors: John A. Thompson, Milwaukee, Wis.; Christopher B. Keogh, Winston-Salem, N.C.

[73] Assignee: Henkel Corporation, Minneapolis, Minn.

[21] Appl. No.: 649,016

[22] Filed: Sep. 10, 1984

[51] Int. Cl.[4] .............................................. C08L 61/28
[52] U.S. Cl. .................................... 524/247; 524/251; 524/428; 524/512; 525/155; 525/163
[58] Field of Search ............... 524/512, 388, 314, 247, 524/251, 428; 525/155, 163

[56] References Cited

U.S. PATENT DOCUMENTS

| | | | |
|---|---|---|---|
| 3,928,273 | 12/1975 | Chang et al. | 524/512 |
| 3,996,177 | 12/1976 | Ludwig | 524/512 |
| 4,098,746 | 7/1978 | Becker et al. | 524/512 X |
| 4,157,994 | 6/1979 | Totty et al. | 524/512 |
| 4,383,075 | 5/1983 | Abel | 524/512 |

*Primary Examiner*—Theodore E. Pertilla
*Attorney, Agent, or Firm*—Ernest G. Szoke; Patrick J. Span; Robin M. Davis

[57] ABSTRACT

Liquid molding compositions are provided which include methylol amino compounds and vinyl polymers that can crosslink with such amino compounds. These liquid molding compositions are used to treat fibrous substrates, and, by drying, heating, and molding, a molded, shaped article is produced having a substrate with from about 5 to about 85% by weight of a crosslinked vinyl polymer, from about 1 to 15% by weight of a methylol amino compound that the vinyl polymer is crosslinked to, and less than 10% by weight water.

7 Claims, No Drawings

CROSSLINKED VINYL POLYMER COMPOSITIONS AND PROCESS FOR PREPARING MOLDED SHAPED ARTICLES

BACKGROUND OF THE INVENTION

This invention relates to moldable fiber products. Compositions used in treating substrates, a process for making a molded article, and the finished molded articles themselves are provided for. One such type of article, molded fiber compositions, can be used for interior decoration, automobile trunk liners, filters, acoustical and thermal insulation, and the like.

There is in textile industry's scrap a large volume of material which presently is used as furniture stuffing, mattress insulator pads and other similar applications. The source of these fibers are of two general classes. The first group being reused fibers such as excess tire cord or carpet waste. The reused fibers are obtainable in a single consistency, i.e. a specific type of fiber. Reused fibers may also be obtained in mixtures when the processor combines different types of fibers together prior to grinding the fibers.

A second type of waste fiber is referred to as shoddy. Shoddy is also a ground mixture but most typically consists of a variety of fibers. The variety in the mix of shoddy is due to the use of scrap from tailored articles such as suits or dresses. In making the shoddy the manufacturer does not usually separate the various sources of fiber and therefore blends will be obtained.

While some uses of reused fiber and shoddy are made, they are a rather low value product of which there is a considerable excess which may be discarded by the manufacturer as scrap.

There therefore remains to be found a significant volume usage for scrap fibers. Any of these scrap fibers as well as virgin fibers can be used as substrates in the instant invention. Moreover, the compositions described herein are also useful in the molding of substrates such as wood scrap or shredded newsprint or other paper.

Throughout the specification and claims percentages and ratios are by weight and temperatures are in degrees Celsius unless otherwise indicated.

BRIEF DESCRIPTION OF THE INVENTION

The molding composition contemplated by the instant invention, used to treat substrates, comprises:
1. a vinyl polymer crosslinkable with a methylol amino compound, said polymer having a glass transition temperature in excess of 35° C.;
2. a sufficient amount of the methylol amino compound to react with the vinyl polymer; and
3. a sufficient amount of base to maintain an alkaline pH.

Any vinyl polymer having a glass transition temperature in excess of 35° C. that will crosslink with a methylol amino compound is suitable for use in these liquid molding compositions. Such vinyl polymers have reactive sites which enable this crosslinking to occur. These reactive sites typically include hydroxyl, carboxyl, or amide functionalities.

The methylol amino compound is added in a sufficient amount to crosslink with the available reactive sites on the polymer. Complete crosslinking with all the reactive sites will insure that the maximum rigidity is achieved, resulting in a molded shaped article of maximum rigidity.

It is, moreover, in treating these fibrous substrates with the molding composition described above in accordance with the process described herein that a molded, shaped article of maximum rigidity is produced. The terms "molding composition" and "liquid molding composition" are used throughout to refer to the noncured composition described above which is used to treat the fibrous substrate before the actual molding takes place which produces the rigid, shaped article.

The liquid molding compositions also have a sufficient amount of base to maintain the composition at an alkaline pH. This will stabilize the polymer and the methylol amino compound. Desirably, the base used is fugitive so that it is driven off by heat when treating the substrate.

The liquid molding composition should be used with a solvent vehicle. This solvent prevents gelling and holds the molding composition so that penetration of the substrate is possible. The most preferred solvent is water. The solvent should be used in a sufficient amount to hold the needed amount of the vinyl polymer, the base, and the methylol amino compound. This can be in an amount of from about 7 to 90% by weight. Acceptably a water solvent is used in an amount of from about 10 to about 90% by weight.

Permissively, other ingredients can be added for wetting, viscosity control, resin hardening, and plasticizers.

The previously described liquid molding composition can be used to treat a fibrous substrate in order to obtain a molded, shaped rigid article. The molding process itself will produce an article containing cured polymers derived from the liquids molding composition. A process for manufacturing a molded, shaped rigid article from a fibrous substrate using the compositions of the instant invention comprises:

(A) treating a fibrous substrate with a liquid molding composition including a vinyl polymer crosslinkable with a methylol amino compound, said polymer having a glass transition temperature in excess of 35° C.; a sufficient amount of the methylol amino compound to react with the vinyl polymer; and a sufficient amount of base to maintain an alkaline pH;

(B) removing the excess amount of the liquid molding composition that remains on the treated substrate;

(C) drying the treated substrate;

(D) heating the treated dried substrate above the highest glass transition temperature of the crosslinkable vinyl polymer and molding the treated dried, heated substrate into a final, desired shape; and (E) removing the treated shaped substrate from the mold, thereby obtaining a completed shaped rigid article.

In treating the substrate with the previously indicated liquid molding composition, any suitable method of contacting the substrate with the composition is acceptable. After the substrate is contacted with the liquid molding composition, the excess liquid is removed from the substrate, which is then dried, heated, shaped, and molded. Most preferrably a cold mold is used in the molding. The finished shaped rigid article is then removed from the mold.

Preferably, water is used in the substrate-treating liquid molding composition described under (A). With the presence of water it is necessary to add a drying step to the above described process in order to reduce the water content. Thus, after step (B), which calls for the removal of the excess of the treating composition named under (A), the treated substrate is dried to reduce the water content.

A molded shaped rigid article made with a liquid molding composition used in accordance with this invention typically contains cured polymers comprising:

(A) from about 5 to about 85% by weight of a vinyl polymer, having a glass transition temperature in excess of 35° C., crosslinked with a cured methylol amino compound, said cured methylol amino compound being present in an amount of from about 1% to about 15% by weight.

The base used in the liquid molding composition is not present in the shaped molded article since it was removed in the process producing the article. Any solvent used is present in amounts of less than 10% by weight of the dried pickup weight percent.

DETAILED DESCRIPTION OF THE INVENTION

The first aspect of the present invention to be discussed is the substrate which is treated, processed, and molded into the desired shaped article. The substrate used may be any type of fibrous material having a minimum structure which gives it a stability, or a tendency to stay together so that it can be handled, and moved in the manner necessary for processing into the shaped article. Thus the substrate should be stable enough to permit it to be contacted with the liquid molding composition and molded into the desired shape. Generally stated, the substrate must have sufficient stability to permit it to be moved and flexed without falling apart.

Any type of fibrous material can be used as the substrate. Moreover, there is no definite initial shape required for the process of the instant invention.

In addition to having the necessary stability, the substrate should not be brittle, but rather must be sufficiently flexible to allow it to be molded.

Representative but non-exhaustive examples of acceptable substrates are shaved or ground wood, shreaded or ground paper, nylon tire cord fibers woven or non-woven fabric, virgin fibers or polymeric fibers. Furthermore, scrap material such as shoddy or reused fiber may be employed within the present invention.

Representative but non-exhaustive examples of some preferred fibers, from whatever source obtained, which are useful in the present invention include polypropylene, polyester, nylon, acrylics, polyamide fibers, acetates, cotton, and wool. The two latter mentioned fibers are for reasons of cost not particularly desirable in the present invention, however, these fibers are well suited to the liquid molding compositions of the present invention.

It is preferred when using virgin fibers to obtain fibers within the range of from about 3 to about 30 denier. The denier measurement system is the mass in grams of 1,000 meters of a single strand of fiber. When using a scrap fiber, it is possible to go as low as about 1.5 denier and as high as about 40. A most preferred overall range for the use of the fibers is from about 6 to about 25 denier.

The individual fibers, whether virgin or scrap, can be cut into a length of from about 35 millimeters to about 100 millimeters although the length is not critical. The end products of the present invention are preferably to be now woven, relying upon the chemical compositions described herein to form the shaped article. It is possible to use woven fabrics although the cost could be prohibitive.

Fibrous materials, not ordinarily having sufficient stability to permit them to be moved and processed without falling apart, can be formed into a suitable substrate by a garnetting operation where the fibers are formed into a web and layer upon layer of the webs are overlayed to form a continuous sheet. To stabilize this mass of fibers, a needling operation is usually conducted. The needling operation consists of passing the web of fibers through a machine which perpendicularly inserts barbed needles through the bundle of fibers. The needling causes the fibers to be drawn perpendicularly through the web to become mechanically locked to the transverse, thereby imparting strength and stability.

Other methods of putting fibers into a sufficiently stable form so that they can be used as a substrate for processing into the shaped articles of the present invention include:

1. spraying the fibers with a preliminary holding agent in a sufficient amount to impart strength to the fiber;
2. forming the substrate with air-laid fibers; and
3. using a carding operation.

The last two procedures would usually, but not necessarily employ chemical or mechanical stabilization to hold the fibers together as the substrate. The substrate, which has the general consistency of a piece of felt, can then be treated in accordance with the instant invention to obtain the molded article previously described.

The next component of the present invention to be discussed are the liquid molding compositions used to treat the substrate. These compositions can include mixtures of polymers and copolymers so long as this mixture is crosslinkable, providing reactive sites to crosslink the methylol amino compound. Any vinyl polymer having reactive hydroxyl, carboxyl, or amide funtionalities will cross link, and is acceptable for use with the instant invention. Such polymers, or mixtures of polymers and copolymers can include polymers such as: polyvinyl acetate, polyvinyl acetate containing N-methylolacrylamide, a carboxylated polystyrene, or a polymer made from materials selected from the group consisting of:

(i) methylacrylate and methylmethacrylate;
(ii) ethylacrylate;
(iii) acrylic acid; and
(iv) methacrylic acid.

Most preferably the acrylic compounds are selected from the group consisting of:

(i) methyl acrylate and methylmethacrylate and mixtures thereof, and
(ii) ethylacrylate, and
(iii) acrylic acid and methacrylic acid and mixtures thereof in a weight ratio of to (i) to (ii) of about 2:1 to about 1:2, and a weight ratio of (i) or ii to (iii) of about 8:1.

The crosslinkable vinyl polymer can acceptably be used in an overall concentration range of from about 5 to 75% by wt. of the overall fluid composition used to treat the substrate. In preferred embodiments, these polymers can be present in amounts of from about 15 to 65% by wt., or from about 10 to 50% by wt. If, however, another polymeric resin hardener such as carboxylated polystyrene or polystyrene is used which also has available crosslinking sites, then the overall concentration of the methyl acrylate, methylmethacrylate, ethyl acrylate, and acrylic acid polymers used can be in the range of from about 5 to 15% by wt. of the total substrate-treating composition.

The number of reactive sites within the crosslinking vinyl polymers can acceptably be as high as 30% by weight, or in the range of from about 2% to about 30% by weight. Preferably, the polymers used are from about 2 to 15% crosslinkable. A representative but nonexhaustive example of polymers having reactivity within this range are carboxylated polystyrenes such as carboxylated polystyrene emulsions that are from about 2 to about 15% carboxilated. Examples of such carboxylated polystyrene emulsions that are commercially available are:

the carboxylated polystyrene emulsions:
LYTRON614 (7% carboxylated)
LYTRON5200 (4% carboxylated) and the carboxylated acrylic emulsion:
AMSCORES 200 (6% carboxylated).

The methylol amino compounds suitable for use as crosslinking agents in the liquid molding compositions of the instant invention include melamine formaldehyde and alkylated melamine formaldehyde. These must be used in a sufficient amount to react with available sites in the polymers used in the liquid molding compositions. Preferably, the crosslinker is used in excess. For the liquid molding compositions specified in this description, an acceptable amount of crosslinker is from about 2.5 to about 25% by weight of the total liquid composition is acceptable. Preferably, the crosslinking agent is used in an amount of from about 2.5 to about 11% by weight.

Another component required in the liquid molding compositions is described as a sufficient amount of base to maintain the pH of the chemical composition conveniently greater than 8.5, preferably greater than or equal to 9. The elevated pH stabilizes the resin components (a) and (b) of the present invention so that they do not prematurely gel. The base is a fugitive base in that it will be driven off during a heat cure operation as later described. That is, the base is not desired in the end product and its presence inhibits the curing operation, therefore a portion of the heat treatment directed to curing the resin system also effectively removes the base. A highly preferred base is 2-amino-2-methyl-1-propanol. Other acceptable bases include ammonia, methylamine, triethanolamine, ethanolamine, diethanolamine, and ethylamine and mixtures of the foregoing. Acceptably the amount of base needed is from about 1 to about 3% by weight of the treating composition.

Other additives can also be used in the liquid molding compositions. Wetting agents, for example, are sometimes added to the compositions to help penetration into the substrate. Any known wetting agent can conveniently be used to increase this penetration. Wetting agents are typically of the anionic, nonionic, amphoteric, zwitterionic, or cationic variety. Most preferably, the wetting agent is an anionic material. The wetting agent is conveniently used at a level of from about 0.1% to about 5%, most preferably from about 0.5% to about 2.5% by weight. The practical level of the amount of wetting agent used is mainly determined by that amount which is necessary to sufficiently wet the non-woven substrate.

Suggested wetting agents include sulfonated aliphatic polyesters of varying weight, such as disodium octyl sulfosuccinate, phosphate ester derivatives, sulfated alkyl esters such as sodium lauryl sulfate, sodium alkyl naphthalene sulfonate and ethoxylated alkyl phenol.

A further ingredient used in the liquid substrate-treating molding composition is a solvent. That is, the resin components of the present invention would not sufficiently penetrate the substrate in the absence of the solvent carrier. The solvent should also function to stabilize the resins which might otherwise prematurely gel. The most preferred solvent is water. The solvent can be used in an amount of from about 10 to 90% by weight of the total composition. The amount of water used in the present invention is expressed as the total amount in the chemical composition from any source. Acceptably in a more concentrated liquid molding composition the amount of water employed can be from about 15 to about 60% by weight of the composition, or, with composition less concentrated in the crosslinking vinyl polymer, the amount of water could be from about 40 to about 90% by weight.

Preferred compositions of the instant invention can also include a viscosity control agent, which controls the viscosity of the liquid resin composition used to treat the substrate. Conveniently propylene glycol is used in an amount less than 3% by weight. Most preferably it is present in an amount of from about 1 to about 3% by weight.

While the instant invention typically requires having a glass transition temperature ($T_g$) in excess of 35° C., a higher $T_g$ might be required for some applications. For this reason, more preferred liquid molding compositions have vinyl polymers with minimum $T_g$ of 70° C. which are reactive to methylol amino crosslinking agents. For some uses of the finished, shaped molded article, such as automobile trunk liners, even higher ($T_g$) might be required. The liquid molding compositions used to produce the articles for these applications have crosslinkable vinyl polymers with glass transition temperatures in excess of 85° C.

A preferred liquid molding composition for treating the substrates comprises:
(a) from about 5% to about 70% of a vinyl polymer selected from the group consisting of:
(i) methyl acrylate and methylmethacrylate and mixtures thereof, and
(ii) ethyl acrylate, and
(iii) acrylic acid and methacrylic acid and mixtures thereof in a weight ratio of (i) to (ii) of about 2:1 to about 1:2 and a weight ratio of (i) or (ii) to (iii) of about 50:1 to about 8:1;
said polymers being crosslinkable with melamine formaldehyde, and also having glass transition teperatures in excess of 35° C.;
(b) from about 2.5% to about 11% by weight of an alkylated melamine formaldehyde resin;
(c) from about 0.1 to about 5% by weight of a wetting agent;
(d) from about 40% to about 90% by weight water; and
(e) a sufficient amount of base to maintain an alkaline pH.

The above components (a) (i) and (a) (ii) are used in a weight ratio of from about 2:1 to about 1:2 preferably about 3:2 to about 2:3 to form the copolymer. The preferred polymer contains as (i) and (ii) methylmethacrylate and ethyl acrylate in a 1:1 weight ratio. Component (a) (iii) in this copolymer is preferably acrylic acid which is employed at a ratio of (a) (i) or (b) (ii) to (b) (iii) of 48:1 to 9:1. A desirable variation of the present invention is to obtain copolymer (a) which has a glass transition temperature of from about 35° C. to about 45° C., preferably from about 37° C. to about 42° C. The glass transition temperature of component (a) can be determined by any convenient method such as that suggested by Rohm and Haas publication CM-24 L/cb herein incorporated by reference.

Component (a) is conveniently used in the present invention as a premixture with water at a concentration from about 30 to 90 percent water with the remainder of the product being solids when the polymerization reaction is conducted. Conveniently the water content can be from 25 to 70 percent in the rest of the product. As it will be appreciated when the more dilute solution of component (a) is utilized, there may be some additional difficulty encountered in balancing the total aqueous content of the formulation as recited in the Summary. When used with melamine formaldehyde crosslinks, a surfactant, water, and a sufficient amount of base, component (a) is preferably used at a level of from 7% to about 22%, most preferably 8.5% to 18.0% by weight.

Methylol amino compounds that are capable of crosslinking with polymers which have reactive sites such as hydroxyl carboxyl and amide functionalities are used as crosslinking agents in the liquid molding compositions of the instant invention. This includes melamine formaldehyde compounds. The structural formula for these preferred crosslinking agents, the melamine formaldehyde compounds, is:

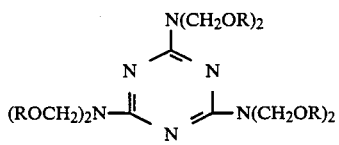

Here, R is an alkyl group or hydrogen. Preferably, the alkyl group contains from about 1 to about 10 carbon atoms, most preferably from about 3 to about 8 carbon atoms. The degree of alkylation is the number of alkyl groups (R) per mole of the base structure (I). By varying the degree of alkylation (or conversely the hydrogenation) the reactivity of the melamine components can be controlled. Those with the longer alkyl groups having less reactivity than the melamine components with shorter alkyl groups.

Component (b) of the previously indicated preferred liquid molding composition is the preferred melamine formaldehyde, and is used in a sufficient amount to completely crosslink with the available reactive sites in the polymers present.

Other preferred embodiments of this invention call for the addition of additives to the liquid molding compositions. Such agents are added for resin hardening, viscosity control, film formation, and as plasticizers.

Viscosity control agents can be used in amounts of up to about 4% by wt. of the total liquid molding composition. Preferably, they are used in an amount of from about 1 to about 3.5% by wt. A preferred viscosity control agent is propylene glycol.

A plasticizer is another additive employed in preferred embodiments of the instant invention, and can be used in an amount of from about 0.75% to about 7% by wt. Preferably, a plasticizer is used in an amount of from about 1.5 to about 5% by weight. A preferred plasticizer is dibutyl phthalate.

Resin hardeners and film forming agents are also used in preferred liquid molding compositions. These additives can be non-reactive to the methylol amino crosslinkers; as is, for example, a polyvinyl acetate film former, or a pure polystyrene resin hardener; or, they can have reactive polymeric sites. The role of resin hardner or film former can be filled by a vinyl crosslinking polymer. An example of a reactive polymeric resin hardener is carboxylated polystyrene. Since both resin hardeners and film formers can be either reactive or non-reactive in nature, they could comprise an extremely large portion of the liquid molding composition. Broadly, such additives can be present in an amount of from about 5% by wt. to about 65% by wt. If a non-reactive resin hardener or film former is used, the range can acceptably be from about 5% to about 30% by weight (wt.) of the liquid molding composition, or more preferably from about 5% to about 25% by wt. Frequently, however, and most preferably, the vinyl polymers required in the liquid molding compositions of the instant invention will also have film forming or resin hardening characteristics.

The following are some preferred liquid molding compositions that can be used:

1. a composition comprising:
   (a) from about 5% to about 25% of a vinyl polymer having a minimum glass transition temperature of 35° C., said polymer being crosslinkable with melamine formaldehyde, and selected from the group consisting of:
      (i) methyl acrylate and methylmethacrylate and mixtures thereof, and
      (ii) ethyl acrylate, and
      (iii) acrylic acid and methacrylic acid and mixtures thereof in a weight ratio of (i) to (ii) of about 2:1 to about 1:2 and a weight ratio of (i) or (ii) to (iii) of about 50:1 to about 8:1;
   (b) from about 20 to about 45% by weight of polyvinyl acetate;
   (c) from about 2.5% to about 8% by weight of an alkylated melamine formaldehyde resin;
   (d) from about 0.1 to about 12% by weight of a wetting agent;
   (e) from about 15 to about 60% by weight water;
   (f) a sufficient amount of base to maintain an alkaline pH; and
   (g) from about 1 to about 3% by weight of propylene glycol.

2. A composition comprising:
   (a) from about 40 to about 65% by weight of carboxylated polystyrene, having a glass transition temperature in excess of 35° C.;
   (b) from about 2.5% to about 12% of an alkylated melamine formaldehyde resin;
   (c) from about 15 to about 60% by weight water;
   (d) a sufficient amount of base to maintain an alkaline pH, and
   (e) from about 15 to about 25% by weight of polyvinyl acetate.

3. A composition comprising:
   (a) from about 5 to about 20% by weight of carboxylated polystyrene, having a glass transition temperature in excess of 35° C.;
   (b) from about 2.5 to about 7% by weight of an alkylated melamine formaldehyde resin;
   (c) from about 15 to about 60% by weight of water;
   (d) a sufficient amount of base to maintain an alkaline pH;

(e) from about 30 to about 45% by weight of a polyvinyl acetate;

(f) from about 5 to about 15% by weight of a vinyl polymer having a glass transition temperature in excess of 35° C., said polymer being crosslinkable with melamine formaldehyde, and being selected from the group consisting of:
  (i) methyl acrylate and methylmethacrylate and mixtures thereof, and
  (ii) ethyl acrylate, and
  (iii) acrylic acid and methacrylic acid and mixtures thereof in a weight ratio of (i) to (ii) of about 2:1 to about 1:2 and a weight ratio of (i) or (ii) to (iii) of about 50:1 to about 8:1; and (g) from about 1 to about 3% by weight of propylene glycol.

4. A composition comprising:
(a) from about 15 to about 35% by weight of carboxylated polystyrene, having a glass transition temperature in excess of 35° C. and being crosslinkable with melamine formaldehyde;

(b) from about 20 to about 30% by weight of polystyrene;

(c) a sufficient amount of base to maintain an alkaline pH;

(d) from about 3 to about 10% by weight of an alkylated melamine formaldehyde resin;

(e) from about 15 to about 55% by weight water;

(f) from about 0.75 to about 7% by weight dibutyl phthalate;

(g) from about 1 to about 3% by weight propylene glycol.

PROCESSING

The substrate is first impregnated with the chemical composition as first shown in the Summary. The substrate is conveniently introduced into a vat containing the composition which is conveniently applied at room temperature. The substrate will then be saturated to the extent possible with the composition. In practice, the amount of time required to completely saturate the substrate can be determined experimentally. As noted previously, a wetting agent is included to insure that the composition thoroughly penetrates into the substrate.

Alternatively the composition can be kiss-coated or roll-coated onto one or both sides of the substrate. This latter process uses less of the composition and results in a less rigid product. Auto carpeting padding applications are a suggested use of the lower level coating applications.

If desired, the composition can be applied by spraying onto the substrate. This can be done by passing the substrate between two spray guns so that the top and bottom of the substrate are thoroughly saturated. The spray aspect is convenient where it is not desirable to remove the excess material for recycling. In using a spray, however, the substrate might not become loaded with the composition to the desired degree.

The next step, where necessary, is the removal of excess composition for recycling back into the vat. The excess composition can be removed using ringers or nip rolls. There is a desirable amount of the composition which should be left in the non-woven substrate. For the moldable fiber product of the present invention it is desirable that the non-woven substrate contain between 20 and 200% by weight of the cured system on a dry basis.

The next aspect of the present invention is to dry the treated substrate. Drying has been found to be an essential step. The solvent (preferably water) content of the resin system which is necessary to prevent premature gelling of the resin is undesirable in the end product at the molding stage. If the water is not removed, then blistering of the finished product in the molding aspect is possible.

The drying can be conducted conveniently by exposing the treated substrate to a temperature of from about 150° C. to about 230° C., preferably 200° C. to 220° C. so that the solvent is removed. The drying is preferably conducted in a forced air oven although infrared or steam cans or a combination thereof can be used. The water content of the treated substrate is reduced as much as possible, preferably to less than 10% by weight most preferable to less than 2.1% by weight.

The dried substrate can then be shaped to the desirable size for molding. Drying moreover sufficiently hardens the substrate to allow cutting or other means of sizing or shaping. The cut or shaped article is then heat treated to cure (crosslink or polymerize) the components. The heat is in excess of the glass transition temperature of any crosslinkable vinyl polymer used in the liquid molding composition. This temperature is conveniently in the range of from 35° C. to about 300° C. The amount of heat applied is sufficient to raise the entire molded article above the glass transition temperature to ensure curing. Preferably the drying and heating step is combined so that the heated substrate is dried to remove the solvent and by exposure to heat, the substrate is heated to a temperature in excess of the appropriate ($T_g$).

Other preferred embodiments combine in one step:
(1) shaping and heating the treated substrate after it was dried subsequent to liquid removal; or, alternatively,
(2) drying, shaping and heating in one step; here again, also after it was dried subsequent to liquid removal.

In both (1) and (2), heating is done to a temperature in excess of the appropriate glass transition temperature ($T_g$).

After the non-woven substrate is dried it can be cut to size or otherwise shaped and then heated, and thereafter molded. If the heating, drying and shaping steps were not combined, then, cutting to size can also be done after heating and shaping. Thereafter the dried, cut, shaped, heated article is placed in a mold. Cold molding is preferred. The molding depends upon the type of article desired. The products in the present invention are moldable into any form or shape. Often, when using the products as a trunk liner, it will be observed that the end product contains several bends and folds and the resin system and substrates used in the present invention are easily molded into such diverse shapes.

Among the advantages to be observed in the present invention are that, for instance, when the product is used as a trunk liner that it is possible to mold an entire unit rather than separate pieces. Secondly, the product will have a natural nap to it, thereby imparting a carpeted appearance to the automobile trunk. The products also have good permeability, thereby allowing cleaning by vacuuming. In some products, the lack of permeability means that any accumulated dirt stays in the product and expensive and potentially harmful chemical cleaning is necessary to remove the dirt. The products of the present invention are much lighter than current automobile trunk liners, sometimes as much as 50% lighter. The products of the present invention are also quite strong and resistant to tearing. There is a sound-deadening effect to the use of the product of the present invention as an automobile trunk liner and this is desirable in cutting down road noise. The products of the instant invention furthermore require fewer fasteners than current trunk liners.

The products are stackable and in addition thereto can be inserted into an automobile trunk as a single unit piece without the need for straightening out the entire article, thereby providing a savings in labor costs. Prior art carpet liners using shoddy fibers can not be conveniently stacked as they provided an untreated surface and therefore the shoddy fibers are transferred onto the carpet surface therefore requiring immediate vacuuming.

As previously indicated, the molded shaped articles of the instant invention contain cured polymers comprising from about 5 to about 85% by weight of vinyl polymer, and from about 1 to about 15% by weight of the methylolamino compound. Any solvent used is present in an amount of less than 10% by weight of the dried pickup weight percent. Other materials used in the liquid molding compositions of the instant invention which are contained in the molded, shaped, rigid article along with the cured polymers are the resin hardeners and film formers. These materials will be contained in the molded shaped articles along with the cured polymers and the methylolamino crosslinker, and will be present in the dried pickup material in the same general ratio in which they were found in the liquid molding composition. Thus, for example, when using a liquid molding composition which is 50 parts carboxylated polystyrene, 20 parts polyvinyl acetate, and 9 parts melamine formaldehyde, the dried pickup material will have these three materials present in the ratio of 50:20:9 respectively. An article made in accordance with the process of the instant invention can have dried pickup material comprising from about 5 to about 30% by weight resin hardener, from about 5 to about 25% by weight film former; from about 1 to about 15% by weight of the methylolamino crosslinker, and from about 10 to about 65% by weight of the crosslinking vinyl polymer.

EXAMPLE

Part A

A liquid molding composition suitable for treating a fibrous substrate was prepared by combining the following materials in the stated amounts:
50 parts carboxylated polystyrene (7% carboxylation); (Tg of 103° C.);
20 parts polyvinyl acetate (as a film former);
19 parts water;
2 parts base;
9 parts melamine formaldehyde (a compound having the structure previously indicated where R averaged 3.7 units of methyl with the remainder being hydrogen.

This liquid molding composition had a ph of 8.9; was 40% solids (and a weight per gallon of about 8.75 lbs.)

Part B

The liquid molding composition described in Part A was used to treat a virgin polyester fiber substrate which was then processed to produce a shaped, rigid article suitable for use as an automobile truck liner.

The following is a description of the process used to produce and automobile truck liner using the virgin polyester fiber substrate and the liquid molding composition described in Part A. The substrate was saturated in the liquid molding composition described in Part A. Thereafter a (niproll) was used to remove the excess liquid molding composition. This (niproll) removal achieved a wet pickup content of the liquid composition of 100% (the total composition thus being equal part fiber to liquid composition).

After removal of the excess liquid, the treated substrate was then dried in an oven for a period of about 7 minutes over a temperature range of 200° to 230° C. Thereafter, the dried substrate was cut to the size required for an automobile truckliner. The dried, cut substrate was then heated to a temperature in excess of the glass transition temperature of the carboxylated polystyrene (the $T_g$ experimentally found to be 103° C.) To accomplish this, the dried cut substrate was maintained at 200° C. for one minute. While still warm, the treated, dried substrate was put onto a mold, pressure was applied and the hot, dried substrate was thereby molded into the shape of an automobile trunkliner.

The cured molded article was tested and found to have a higher cured glass transition temperature of 105° C. This newly produced article, (an automobile trunkliner) was also found to have a 26% dry pickup thus giving a composition of about 74% by weight virgin polyester fibrous substrate and about 26% of the dry shape giving material. This 26% is estimated to have a composition of about 16.46 carboxylated polystyrene, about 6.58% poly vinyl acetate, and about 2.96% melamine formaldehyde with only a trace of water.

What is claimed is:

1. A liquid composition for treating and molding fibrous substrates into shaped articles comprising:
    (a) from about 40% to about 60% by weight of carboxylated polystyrene having a glass transition temperature in excess of 35° C.;
    (b) from about 2.5% to about 12% of an alkylated melamine formaldehyde resin;
    (c) from about 15 to about 60% by weight water;
    (d) a sufficient amount of a fugitive base to maintain an alkaline pH, and
    (e) from about 15 to about 25% by weight of polyvinyl acetate.

2. A composition as described in claim 1 wherein the fugitive base is sufficient to maintain the ph of the composition equal to or greater than 8.5.

3. A composition as described in claim 1 wherein the fugitive base (C) is selected from the group consisting of 2-amino-2-methyl-1 propanol, ammonia, methylamine, triethanolamine and ethylamine.

4. A liquid composition for treating and molding fibrous substrates into shaped articles consisting essentially of:
    (a) from about 5% to about 25% of a vinyl acrylate polymer having a minimum glass transition temperature of 35° C., said acrylate polymer being crosslinkable with melamine formaldehyde, and being a copolymer of:
        (1) an acrylate monomer selected from the group consisting of methyl acrylate and methylmethacrylate and mixtures thereof, and
        (ii) ethyl acrylate, and
        (iii) an acrylic acid monomer from the group consisting of acrylic acid and methacrylic acid and mixtures thereof wherein the weight ratio of (i)

to (ii) is about 2:1 to about 1:2 and a weight ratio of (i) to (ii) to (iii) is about 50:1 to about 8:1;
(b) from about 20 to about 45% by weight of polyvinyl acetate;
(c) from about 2.5% to about 8% by wieght of an alkylated melamine formaldehyde resin;
(d) from about 15 to about 60% by weight water; and
(e) a sufficient amount of a fugitive base to maintain an alkaline pH.

5. A composition as defined in claim 1, wherein said carboxylated polystrene has a glass transition temperature of 103° C.

6. A liquid composition for treating and molding fibrous substrates into shaped articles comprising:
(a) from about 5 to about 20% by weight of carboxylated polystyrene, having a glass transition temperature in excess of 35° C.;
(b) from about 2.5 to about 7% by weight of an alkylated melamine formaldehyde resin;
(c) from about 15 to about 60% by weight of water;
(d) a sufficient amount of a fugitive base to maintain an alkaline pH;
(e) from about 30 to about 45% by weight of a polyvinyl acetate;
(f) from about 5 to about 15% by weight of a vinyl acrylate polymer having a glass transition temperature in excess of 35° C., said acrylate polymer being crosslinkable with melamine formaldehyde, and being a copolymer of:
  (i) methyl acrylate and methylmethacrylate and mixtures thereof, and
  (ii) ethyl acrylate, and
  (ii) acrylic acid and methacrylic acid and mixtures thereof in a weight ratio of (i) to (ii) of about 2:1 to about 1:2 and a weight ratio of (i) or (ii) to (iii) of about 50:1 to about 8:1.

7. A liquid composition for treating and molding fibrous substrates into shaped articles comprising:
(a) from about 15% to about 35% by weight of carboxylated polystyrene, having a glass transition temperature in excess of 35° C. and being crosslinkable with melamine formaldehyde;
(b) from about 20 to about 30% by weight of polystyrene;
(c) a sufficient amount of a fugitive base to maintain an alkaline pH;
(d) from about 3 to about 10% by weight of an alkylated melamine resin; and
(e) from about 15 to about 55% by weight water.

* * * * *